United States Patent
LaFata et al.

(10) Patent No.: US 9,641,576 B2
(45) Date of Patent: May 2, 2017

(54) DYNAMIC LOCALE BASED AGGREGATION OF FULL DUPLEX MEDIA STREAMS

(71) Applicant: Amazon Technologies, Inc., Seattle, WA (US)

(72) Inventors: Christopher LaFata, San Francisco, CA (US); Michael Klingbeil, New Haven, CT (US); Adam Marks, Los Angeles, CA (US); Carlin Wiegner, Sacramento, CA (US)

(73) Assignee: Amazon Technologies, Inc., Seattle, WA (US)

(*) Notice: Subject to any disclaimer, the term of this patent is extended or adjusted under 35 U.S.C. 154(b) by 45 days.

(21) Appl. No.: 14/580,866

(22) Filed: Dec. 23, 2014

(65) Prior Publication Data

US 2016/0014373 A1 Jan. 14, 2016

Related U.S. Application Data

(60) Provisional application No. 62/023,749, filed on Jul. 11, 2014.

(51) Int. Cl.
*H04M 3/42* (2006.01)
*H04L 29/06* (2006.01)
*H04L 29/08* (2006.01)
*H04N 7/15* (2006.01)
*H04M 3/56* (2006.01)
*H04N 5/04* (2006.01)

(52) U.S. Cl.
CPC ............ *H04L 65/403* (2013.01); *H04L 67/10* (2013.01); *H04M 3/56* (2013.01); *H04N 7/152* (2013.01); *H04N 5/04* (2013.01)

(58) Field of Classification Search
CPC .......... H04N 5/04; H04L 65/403; H04L 67/10
USPC .................... 348/14.01–14.16; 370/259–271, 370/351–357; 709/201–207, 217–248
See application file for complete search history.

(56) References Cited

U.S. PATENT DOCUMENTS

| | | | |
|---|---|---|---|
| 6,347,084 B1 | 2/2002 | Hulyalkar et al. | |
| 6,687,234 B1* | 2/2004 | Shaffer ................. | H04L 12/185 370/260 |
| 6,868,069 B2 | 3/2005 | Knobbe et al. | |
| 7,433,327 B2* | 10/2008 | Harville ................. | H04N 7/142 348/E7.079 |

(Continued)

OTHER PUBLICATIONS

"Cristian's algorithm," Wikipedia webpage, last modified Aug. 19, 2013. Accessed Jul. 16, 2014 at http://en.wikipedia.org/wiki/Cristian%27s_algorithm.

*Primary Examiner* — Hemant Patel
(74) *Attorney, Agent, or Firm* — Thorpe North & Western LLP

(57) ABSTRACT

A cloud-based video/audio conferencing system and method performs locale based aggregation of a full duplex media stream to organize multiple connections to a conference call that originate from the same physical location or a shared locale. The cloud-based video/audio conferencing system performs synchronization of the microphone and speaker audio signals of the same-locale connections. In this manner, a conference call may be held with multiple user devices making connections from the same physical location. User experience is enhanced by allowing each user in the same location to use his/her own individual devices to connect to the same conference call.

21 Claims, 7 Drawing Sheets

(56) References Cited

U.S. PATENT DOCUMENTS

| | | |
|---|---|---|
| 7,558,224 B1 * | 7/2009 | Surazski ............... H04R 27/00 |
| | | 370/260 |
| 7,664,057 B1 | 2/2010 | Wu et al. |
| 7,668,243 B2 | 2/2010 | Ho et al. |
| 7,787,404 B2 | 8/2010 | Zhang et al. |
| 7,961,635 B2 | 6/2011 | Werner et al. |
| 8,238,376 B2 | 8/2012 | Iwamura |
| 8,494,009 B2 | 7/2013 | Fourcand |
| 2013/0106977 A1 * | 5/2013 | Chu ....................... H04N 7/142 |
| | | 348/14.02 |
| 2014/0006610 A1 | 1/2014 | Formby et al. |
| 2014/0073300 A1 * | 3/2014 | Leeder ................ H04B 5/0031 |
| | | 455/416 |

* cited by examiner

DYNAMIC LOCALE BASED AGGREGATION OF FULL DUPLEX MEDIA STREAMS

CROSS REFERENCE TO OTHER APPLICATIONS

This application claims priority to U.S. Provisional Patent Application No. 62/023,749, entitled DYNAMIC LOCALE BASED AGGREGATION OF FULL DUPLEX MEDIA STREAMS, filed Jul. 11, 2014, which is incorporated herein by reference for all purposes.

BACKGROUND OF THE INVENTION

Video and audio conferences, or conference calls, may be held involving multiple participants located at the same physical location, such as the same conference room, with other participants located at a remote location. When a video/audio conference includes multiple participants at the same physical locale, the participants' experience is often not optimal.

The "same locale" problem in video/audio conferencing arises from the fact that generally only one actual device is able to be active for the conference call in any given locale. The device will inevitably be further from some participants in the room than others. This results in varied intelligibility of participants based solely on how near or far the participants are from the single active microphone. Further, the experience of those participants in the shared locale itself is also less than ideal since those furthest from the device are often left struggling to hear the single in-room device's speaker output.

Generally the reason that only one device per locale can be active at a time during a conference call has to do with the way that current Voice over Internet Protocol (VoIP) conferencing software is designed. When one participant connects to a cloud based or peer-to-peer conference call, the participant is sent an audio mix of all other participants except himself. This makes sense as one has no need to hear oneself echoed back to him when speaking.

This audio mixing scheme is generally done per-connection and is completely ignorant of each connection's locale or physical location. That is, a cloud based or peer-to-peer conference call system or method is not aware of the physical location of each connection to the conference call. The audio mixing scheme works well for person-to-person calls and is the current approach employed by cloud based conferencing services such as Skype, GoToMeeting, Facetime, WebEx and others. However, on multi-participant calls when some number of participants shares the same physical location, the experience degrades and the problems associated with multiple participants at the same locale are compounded as more and more participants share the same locale. In other words, the more participants per physical locale, the more the overall experiential quality of the conference call degrades.

Using the conventional VoIP conferencing system, the conference experience may be improved by having multiple participants in the same physical locale use multiple devices to join the conference. That is, every participant has his/her own microphone and own set of speakers. However, using multiple active devices at the same physical location to hold a conventional VoIP conference call is actually not possible. The first issue is audio feedback. Since each same-locale participant receives an audio mix with only his own microphone absent, the participant will still be receiving the microphones of his colleagues who are connected in the same physical locale. The colleagues' audio stream will come out of the participant's speaker and go back into the colleagues' microphones where the audio signal originated and back out the participant's speaker and back into the colleagues' microphones, and so on. This results in the same classic audio feedback problem associated with a Public Address (PA) system when the speaker accidentally points his microphone at the PA speaker. A high pitched squeal ensues which is highly unpleasant.

In the conventional cloud-based VoIP conferencing system, the feedback problem can be eliminated by giving the audio server producing each connection's audio mix a token which identifies participants sharing the same physical locale as such. The conferencing system would use that token to produce locale-based mixes where the mix sent to any connection in a particular physical locale would be absent of the microphone signals of the multiple devices sharing that locale. Thus, if participant A and participant B are in the same room, participant A's microphone signal would not emanate from participant B's speaker and vice versa. The feedback problem is thus solved.

However, even with the feedback problem solved, other problems remain. For instance, each participant's audio client connection will have different latencies. Devices generally have different audio device hardware and driver buffer sizes which is one factor contributing to connection latency variations. An even bigger contribution to differing connection latencies is due to the nature of the Internet itself.

In a packet-based VoIP system, one technique employed to create the illusion of a continuous media stream is the use of adaptive jitter buffering. These buffers dynamically adjust to an ideal size to minimize packet loss with the lowest possible latency based on current network conditions. Since network conditions change often due to congestion, topologies, WiFi loss, etc., each audio client will generally end up with differently sized jitter buffers relative to one another throughout the course of a conference call.

The end result of these differing connection latencies is a poor conference experience on both ends of the call. In the shared physical locale, the participants will experience unsynchronized speaker signals among the in-room devices, which will render the conference call unusable. In the remote locale, the participants will have a similar experience. The microphone signal the remote participants will be receiving from the shared locale will contain a mix of all of the in-room device microphones, which will be similarly desynchronized and jumbled because of the differing latencies.

A side effect of the desynchronization in the shared locale is that the in-room device's Acoustic Echo Cancellation (AEC) software will fail to function for its intended purpose of echo cancellation. AECs are designed to cancel the remote (farend) signal being played out of a device's speakers from the device's microphone (nearend) signal being sent up to the audio server. The desynchronization of the microphone signals at the shared locale will cause the AEC operation to become ineffective so that remote participants end up hearing themselves echoed back to them anytime they speak. This severely degrades the participant experience. In some cases, the remote participants may hear their own voices echoed multiple times, depending on the number of devices in the shared locale. Therefore, the conventional VoIP conference system does not permit multiple active devices to be used at the same physical location for holding a conference call.

BRIEF DESCRIPTION OF THE DRAWINGS

Various embodiments of the invention are disclosed in the following detailed description and the accompanying drawings.

DETAILED DESCRIPTION

Figure 1:
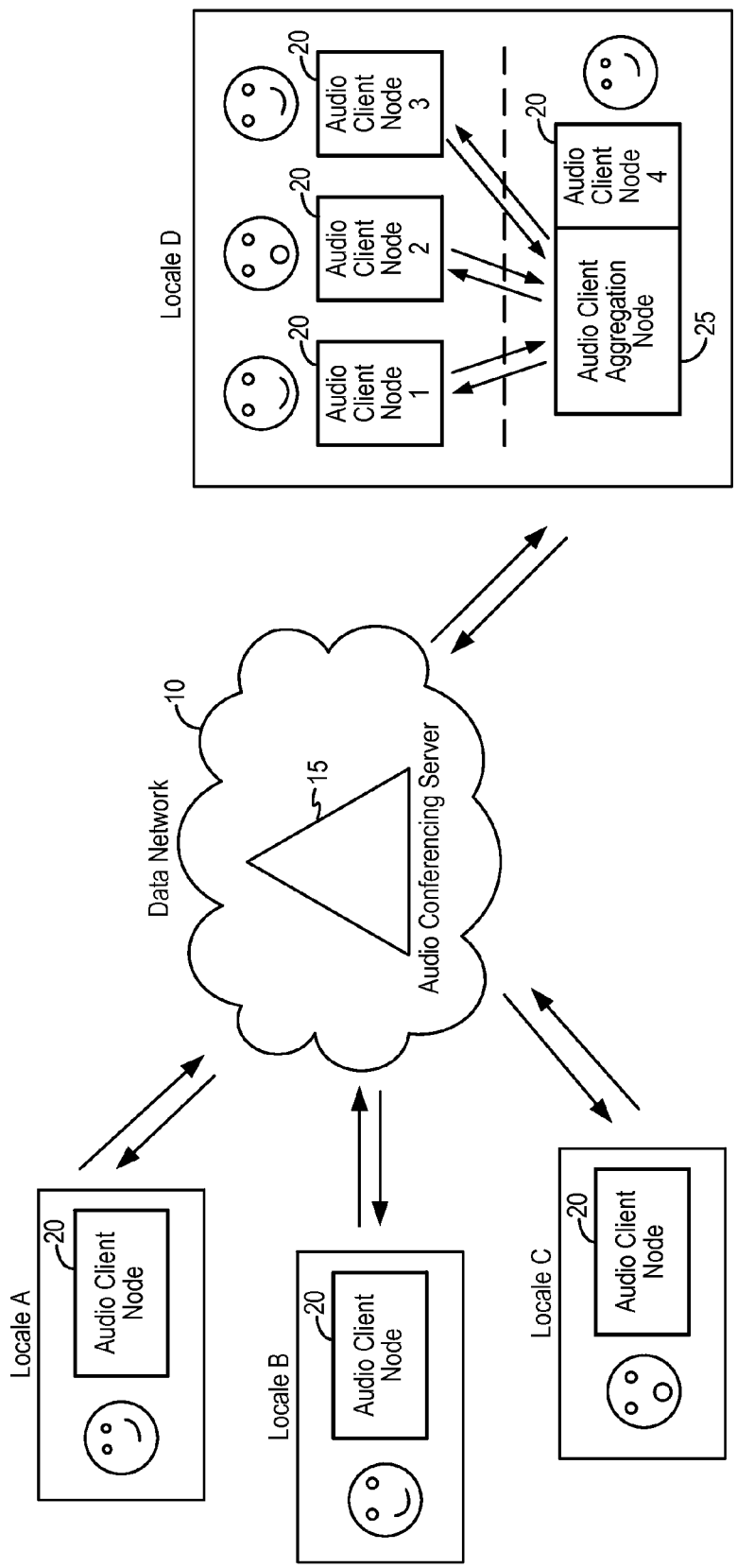
FIG. 1 is a system diagram of a cloud-based video/audio conferencing system employing an aggregation node to support multiple device connections from same conference locale in embodiments of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a cloud-based video/audio conferencing system and method performs locale based aggregation of a full duplex media stream to organize multiple connections to a conference call that originate from the same physical location or a shared locale. Accordingly, multiple active devices can be used in the same locale to connect to a conference call. The cloud-based video/audio conferencing system further performs synchronization of the microphone and speaker audio signals of the same-locale connections. In this manner, a conference call may be held with multiple user devices making connections from the same physical location. User experience is enhanced by allowing each user in the same location to use his/her own individual devices to connect to the same conference call.

In some embodiments, the cloud-based video/audio conferencing system performs automatic detection of conference call connections that may originate from the same physical location. User experience is further enhanced by allowing users to automatically connect to a conference call using their own devices without additional setup steps, regardless of how many other devices may be connected to the same conference call at the same physical location. The cloud-based video/audio conferencing system and method enables effective real-time remote collaboration between users and improves participant experience in instant video and audio conferencing, where some of the conference participants may be attending the conference call in the same physical location.

It is instructive to note that in a closed or dedicated or specially designed audio conferencing system, alignment of speaker or microphone audio signals may be performed easily as the closed system has only a small number of variables and the variables can be ascertained beforehand and accounted for. In some cases, such closed conference call systems are hard wired so that synchronization can be easily performed. However, the cloud-based video/audio conferencing system of the present invention operates as an open system and often relies on the public Internet for transmission of audio data packets. Furthermore, participants may connect to the conferencing system of the present invention using a variety of devices and a variety of connection media, including wireless connections as well as wired connection, and through public data networks (such as the Internet) or private data networks (privately operated LAN). In such an open system, the number of variables becomes large and the network condition is fluid and changing. Therefore, synchronization of the audio signals becomes challenging and cannot be performed using techniques that are generally applied to closed, dedicated conferencing systems. In embodiments of the present invention, the cloud-based video/audio conferencing system implements audio synchronization using software based audio alignment method to enable synchronization of audio signals under challenging network environments.

FIG. 1 is a system diagram of a cloud-based video/audio conferencing system employing an audio client aggregation node to support multiple device connections from same conference locale in embodiments of the present invention. Referring to FIG. 1, a cloud-based video/audio conferencing system includes an audio conferencing server 15 to facilitate a conference call between remote participants. The audio conferencing server 15 is sometimes referred to as a "remote server" or a "cloud-based conferencing server." The audio conferencing server 15 is deployed on a data network 10, such as the publicly accessible Internet or a private data network. The remote participants are typically located at separate locations or locales. In the present example, the conference call is being held with participants at four different locations—Locale A, Locale B, Locale C and Locale D. In the present example, locales A, B and C each has a single participant connecting to the conference call, each user using his or her individual user device. Meanwhile, locale D includes multiple participants where each participant may wish to connect to the conference call using his/her individual user device to enhance the conference experience.

A salient feature of the conferencing system of the present invention is that multiple participants at the same physical location may connect to the same conference call using individual devices. That is, the conferencing system supports a conference call with multiple active device connections from the same physical location. For example, at Locale D, multiple participants may connect to the same conference call with each participant using his/her own device to connect to the conference call.

In the present description, a "locale" refers generally to a physical location at which one or more participants of a conference call is located. More specifically, a "locale" refers to the physical space where audio feedback from multiple active devices used by multiple conference participants to connect to the same conference call would create feedback problems or would create unsynchronized speaker signals or would inhibit the proper functioning of acoustic echo cancellation used in conventional cloud-based conferencing systems. A "shared locale" refers to a locale or physical location occupied by two or more participants of a conference call.

In the present description, a user device or a "device" refers to any type of computing devices, such as laptop computers, desktop computers, tablet computing devices, or smart phones. The user device is capable of connecting to a data network through a wireless or wired connection and is also capable of providing audio and/or video communication.

In the present description, each user device makes a connection to the conference call using an audio client 20, also referred to as a Voice over Internet Protocol (VoIP) audio client. In the present description, an audio client 20 executed on a participant's device is also referred to as an "audio client node." The audio client 20 may be a software process running on a processor of the participant's device. In a typical conference call, each locale includes a single audio client and the audio client nodes 20 at each locale communicate with the audio conferencing server 15 to send and receive audio data packets during a conference call.

In embodiments of the present invention, to facilitate multiple connections to a conference call from the same locale, the cloud-based video/audio conferencing system of the present invention selects one audio client node at the shared locale as an audio client aggregation node 25. For example, in FIG. 1, Locale D includes four participants wishing to connect to the conference call using individual user devices with each user device running its own individual audio client 20. Thus, Locale D includes four audio client nodes 1 to 4 that are to be connected to the conference call. Instead of allowing each audio client node 1-4 to connect individually to the audio conferencing server 15, one of the audio client node 1-4 is selected as the audio client aggregation node 25. In the present example, audio client node 4 is selected to be the audio client aggregation node 25. The audio client aggregation node 25 accepts connections from all audio client nodes in the same shared locale. In the present example, the audio client aggregation node 25 accepts connections from audio clients nodes 1-3. For example, the local audio client nodes 1-3 may communicate with the aggregation node 25 through a local area network. Meanwhile, the audio client aggregation node 25 also process audio data packets from the audio client node 4 to which it is associated.

The audio client aggregation node 25 collects and organizes all local audio signals from audio client nodes 1-4 and communicates with the audio conferencing server 15 over the data network 10. In particular, the audio client aggregation node 25 organizes the multiple full duplex audio streams from the local audio client nodes 1-4 and provides a single full duplex audio stream to the audio conferencing server 15. The audio client aggregation node 25 receives a mixed audio stream from the audio conferencing server 15 and distributes the mixed audio stream to the audio client nodes 1-4 in the shared locale D. In particular the audio client aggregation node 25 provides to each audio client 20 the audio stream from all other conference participants except the audio client's own audio stream.

In the above-described embodiments, the cloud-based video/audio conferencing system of the present invention selects one audio client node at a shared locale with multiple audio client nodes to function as the audio client aggregation node 25. In other embodiments, other methods to select or establish an audio client aggregation node at a shared locale can be used.

Figure 6:
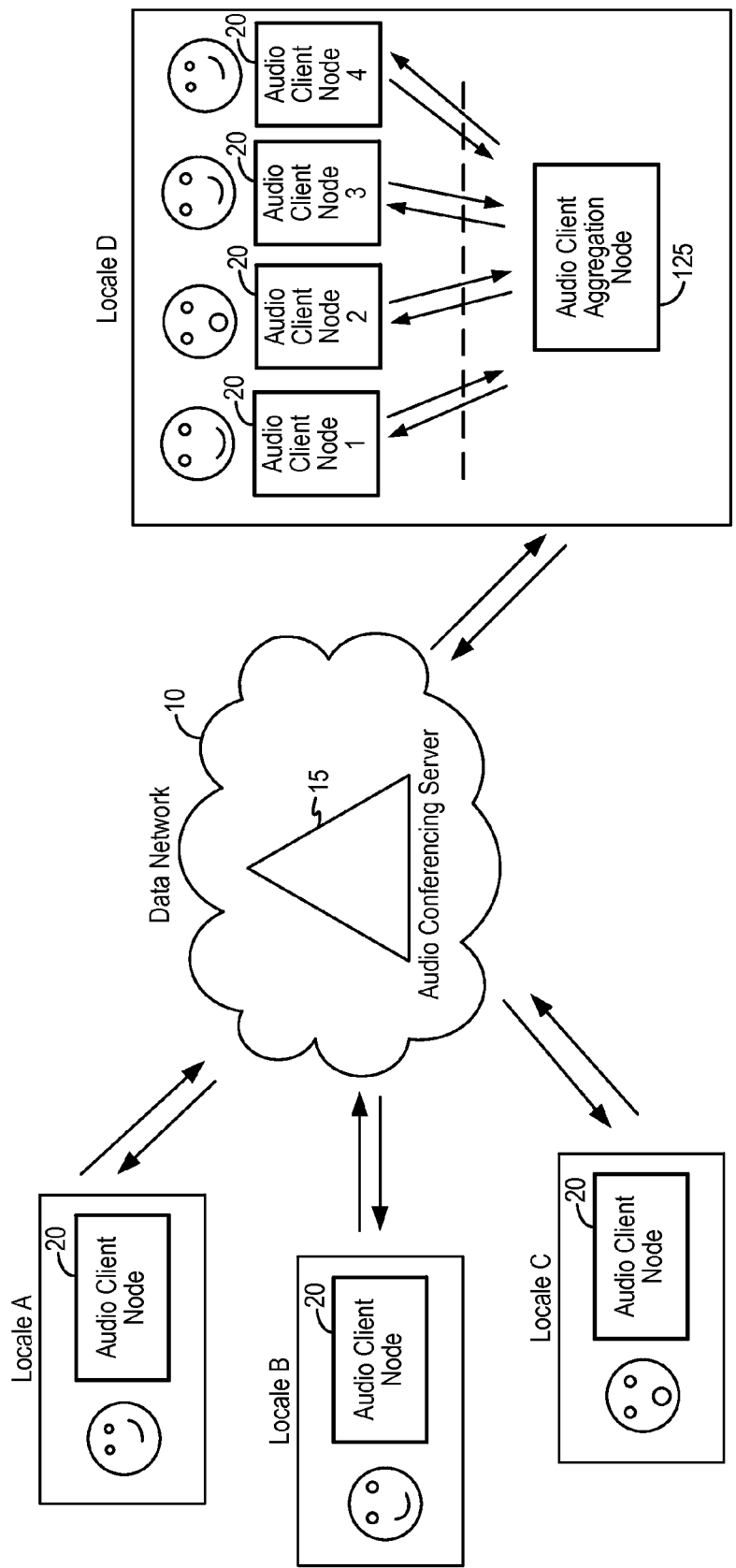
FIG. 6 is a system diagram of a cloud-based video/audio conferencing system employing an aggregation node to support multiple device connections from same conference locale in alternate embodiments of the present invention.

In some embodiments, a dedicated audio client aggregation node 125 may be provided at a shared locale, as shown in FIG. 6. The dedicated audio client aggregation node 125 may be provided on a computing device located at the shared locale, such as a desktop computer, a tablet computing device, or a dedicated audio/video conferencing device. When a dedicated audio client aggregation node 125 is present in a shared locale, all other audio clients nodes 1-4 in the same locale connect to the dedicated audio client aggregation node 125 to participate in a conference call. The dedicated audio client aggregation node 125 collects and organizes all local audio signals from audio client nodes 1-4 and communicates with the audio conferencing server 15 over the data network 10. In some embodiments, the audio client aggregation node 125 organizes the multiple full duplex audio streams from the local audio client nodes 1-4 and provides a single full duplex audio stream to the audio conferencing server 15. The audio client aggregation node 125 receives a mixed audio stream from the audio conferencing server 15 and distributes the mixed audio stream to the audio client nodes 1-4 in the shared locale D. In particular, the audio client aggregation node 125 provides to each audio client 20 the audio stream from all other conference participants except the audio client's own audio stream.

Figure 7:
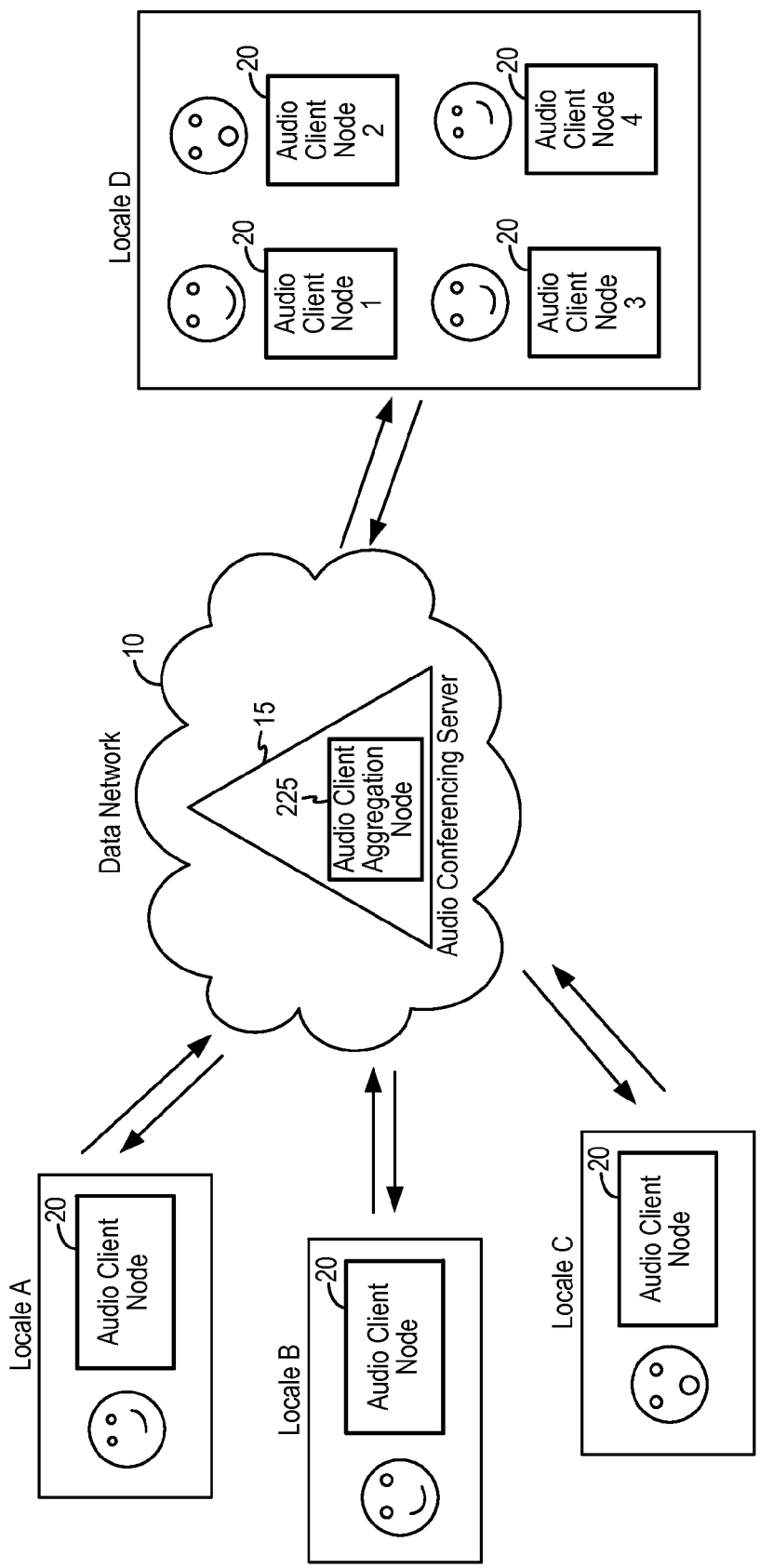
FIG. 7 is a system diagram of a cloud-based video/audio conferencing system employing an aggregation node to support multiple device connections from same conference locale in alternate embodiments of the present invention.

In some embodiments, an audio client aggregation node 225 may be provided on the audio conferencing server 15 disposed on the data network 10, as shown in FIG. 7. In that case, the audio client aggregation node 225 is a cloud-based audio client aggregation node and the audio stream aggregation becomes centralized in the data network 10. The cloud-based audio client aggregation node 225 provided on the audio conferencing server 15 may be accessible by locale-based audio client nodes through the data network 10. With the cloud-based audio client aggregation node 225 thus configured, audio client nodes in a shared locale connect to the cloud-based audio client aggregation node 225 over the data network 10 to participate in a conference call. For example, audio clients nodes 1-4 in the shared locale D all connects to the cloud-based audio client aggregation node 225 over the data network 10 to send and receive audio streams. The cloud-based audio client aggregation node 225 collects and organizes all audio signals from audio client nodes 1-4 in the shared locale D and provides the audio signals to the audio conferencing server 15. In some embodiments, the audio client aggregation node 225 organizes the multiple full duplex audio streams from the audio client nodes 1-4 in the shared locale D and provides a single full duplex audio stream to the audio conferencing server 15. The audio client aggregation node 225 also receives a mixed audio stream from the audio conferencing server 15 and transmits the mixed audio stream over the data network 10 to the audio client nodes 1-4 in the shared locale D. In particular, the audio client aggregation node 225 provides to each audio client 20 the audio stream from all other conference participants except the audio client's own audio stream.

In some embodiments, the cloud-based video/audio conferencing system of the present invention may be implemented using a hybrid aggregation node configuration. For example, the cloud-based video/audio conferencing system may be configured using a selected audio client node as the aggregation node in one locale and using a dedicated audio client aggregation node for other locales. In another example, the cloud-based video/audio conferencing system may be configured using the cloud-based audio client aggregation node for some locales and dedicated or selected audio client aggregation node for other locales. In this manner, the cloud-based video/audio conferencing system realizes flexibility by allowing different locales to implement suitable methods for assigning the audio client aggregation node.

With an audio client aggregation node thus selected, the audio client aggregation node accepts connections from audio client nodes at the same locale. In most cases, the audio client nodes and the aggregation node are on the same local area network and the audio client nodes connect to the aggregation node through the local area network, either through a wired connection or a wireless connection. When a cloud-based audio client aggregation node is used, the audio client nodes may connect to the cloud-based aggregation node through a data network, which may be the publicly accessible Internet. The cloud-based video/audio conferencing system of the present invention is agnostic to the network environment in which it is implemented. In some embodiments, the cloud-based video/audio conferencing system is preferably implemented in a data network having low latency or capable of providing stable network connections. That is, the cloud-based video/audio conferencing system is preferably implemented in a data network where the maximum network latency and the minimum network latency is narrow.

Another salient feature of the conferencing system of the present invention is that the audio client aggregation node performs synchronization of the microphone and the speaker audio signals of all of the local audio client nodes. The microphone and speaker synchronization makes it possible for multiple active devices at the same locale to connect to the same conference call. The conferencing system can thus provide a high quality experience for a shared locale multi-device conference call.

More specifically, when the speakers of the participant devices in the shared locale are tightly synchronized, those devices' acoustic echo cancellation (AEC) software will function acceptably, as the other speaker signals in the room would be seen as early room reflections of the farend signal that each device's AEC will cancel from its nearend signal. Early room reflections are signals that are within the tolerances of the AEC and conventional AEC operations are designed to suppress such reflection signals. The in-room experience of the shared locale is improved when all participant devices' speakers in the room are synchronized, resulting in all participants being able to effectively hear the in-room conference audio. More importantly, aligning the speakers in the shared locale solves the echo/feedback problems described above. The remote participant's conference experience is also improved by the better intelligibility provided by a synchronized mix of all the microphones present in the shared locale.

Figure 2:
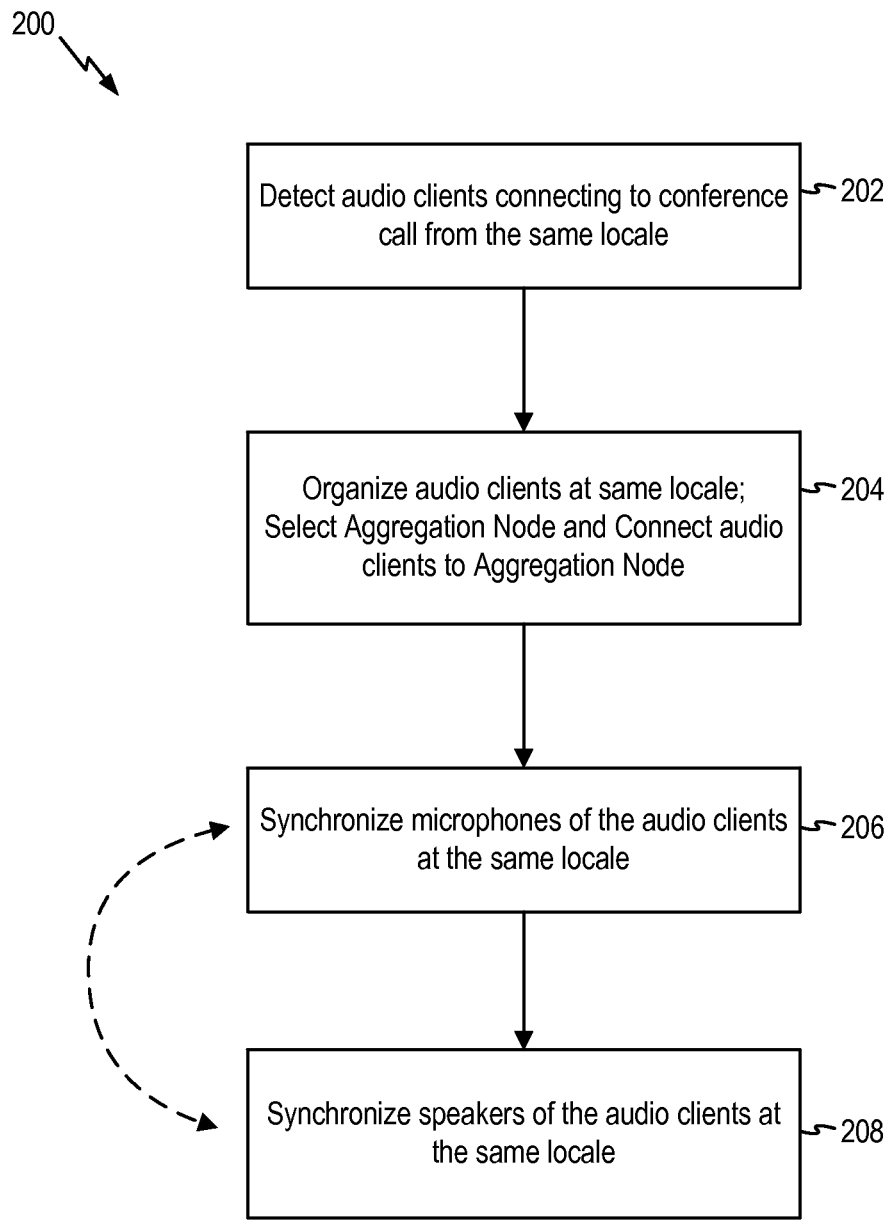
FIG. 2 is a flowchart illustrating a same-locale multiple-device conferencing method in embodiments of the present invention.

FIG. 2 is a flow chart illustrating a same-locale multiple-device conferencing method in embodiments of the present invention. Referring to FIG. 2, a same-locale multiple-device conferencing method 200 starts by detecting the presence of two or more audio clients connecting to the conference call from the same physical location or same locale (202). Various methods for performing the detection automatically will be described below. In some cases, the participants may configure the conference call for multiple local active device connections.

With the detection of two or more audio client connections at the same physical location, the method 200 then organizes the audio client nodes at the same physical location (204). The method 200 selects an audio client aggregation node for the physical location to aggregate the locally generated audio signals. In the present embodiment, one audio client node is selected as the audio client aggregation node. In some embodiments, the selection of the audio client node to function as the aggregation node is dynamic in nature and one or more factors can be used to determine which audio clients should be selected to perform the role of the aggregation node. Once selected, all other audio client nodes connect to the aggregation node and the aggregation node collects the audio streams from all other audio clients at the same locale.

In other embodiments, instead of selecting one audio client node as the audio client aggregation node, the method 200 may select a dedicated device in the locale as the audio client aggregation node. In yet another embodiment, the method 200 may select a cloud-based audio client aggregation node, such as one associated with the conferencing server.

With the audio client aggregation node selected, the method 200 synchronizes the microphone audio signals of all of the audio clients at the same locale (206). In one embodiment, the best microphone signal can be selected as the reference. The method 200 further synchronizes the speaker audio signals of all of the audio clients at the same locale (208). In practice, the synchronization of the microphone audio signals and the speaker audio signals can be performed at the same time or in any order. The specific order of speaker and microphone audio signal synchronization shown in FIG. 2 is illustrative only and not intended to be limiting.

The method 200 is capable of providing optimal user experience in a conference call by allowing users at the same locale to use individual devices to connect to the same conference call. The method 200 organizes and synchronizes the incoming and outgoing full duplex audio streams so that undesired echo and feedback are prevented.

Figure 3:
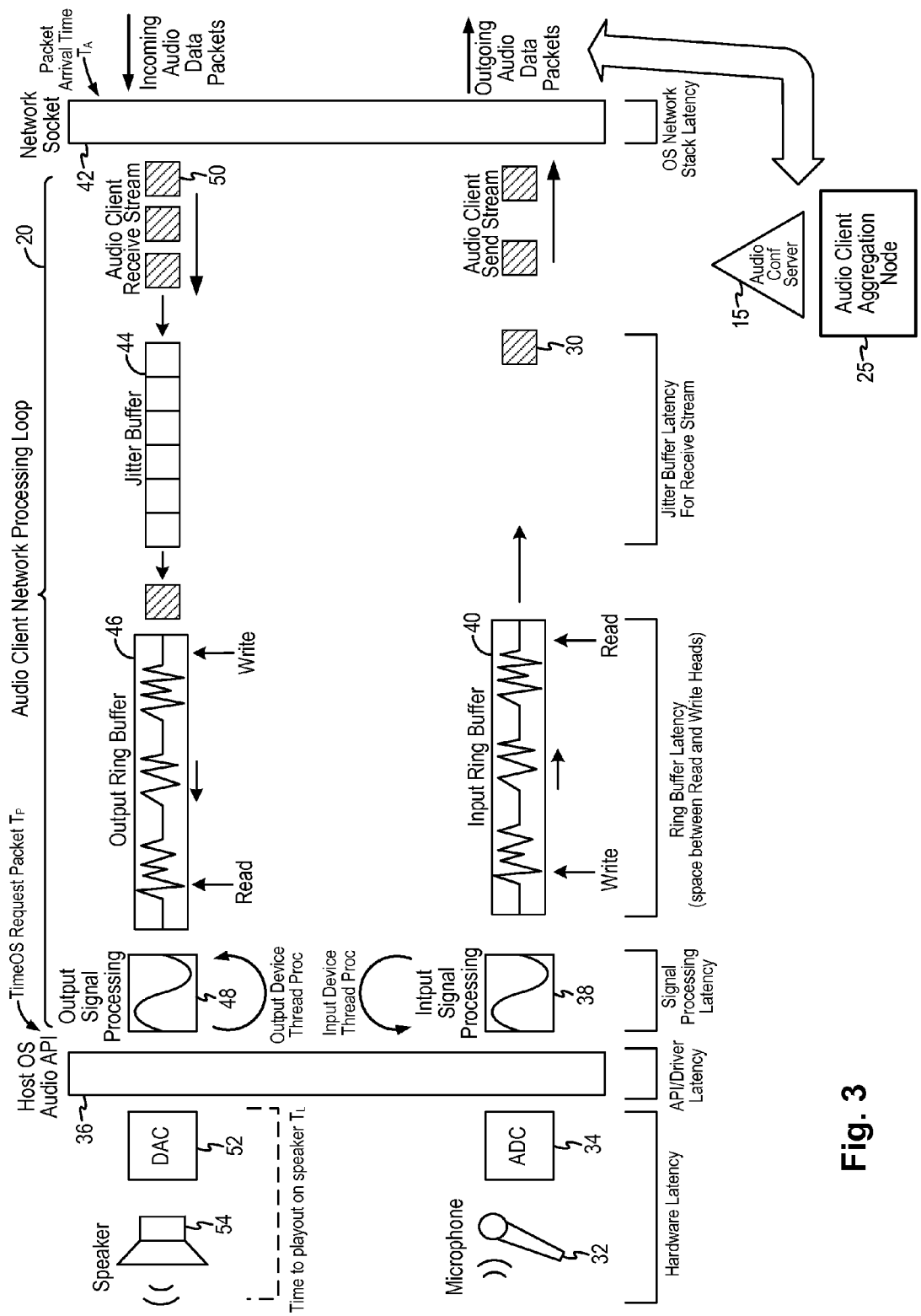
FIG. 3 is a functional diagram of a VoIP audio client in some embodiments.

FIG. 3 is a functional diagram of an audio client configured for Voice over Internet Protocol application in some embodiments of the present invention. Referring to FIG. 3, an audio client 20 is a software process operating as an audio client network processing loop on a host device. In the present description, a host device refers to the electronic device a conference participant is using to connect to the conference call. The host device is assumed to have associated with it a microphone 32 and a speaker 54 and also an operating system (OS) running on a processor of the host device. FIG. 3 also illustrates the latency at different levels in the audio signal processing operation.

The operation of the audio client network processing loop will be described with audio signals being received at the microphone 32 of the host device. The incoming audio signal is digitized by an analog-to-digital converter (ADC) 34 on the host device. The digitized audio signal is then provided to the host operation system audio application programming interface (Host OS Audio API 36) and enters the audio API input device thread process. Meanwhile, the audio client 20 has registered a call back with the host operating system. For example, the audio client 20 is configured to request microphone samples from the audio API at a given sample rate.

When digitized audio signals (or digitized audio samples) are provided to the audio client 20, the audio client performs digital signal processing (input signal processing 38), such as echo cancellation, noise suppression and filtering. The processed audio samples are then put into an input ring buffer 40. The input ring buffer 40 has a write head for receiving and storing incoming audio samples and a read head for reading out stored audio samples. At a predetermined rate, the audio client 20 pull audio samples out of the input ring buffer 40 and sends out the audio samples in the form of an audio client send stream 30 through a network socket 42 to the data network. The audio samples from the microphone 32 is sometimes referred to as "microphone data packets" and the audio client send stream 30 is also referred to as a microphone packet stream 30. In the case the host device is not in a shared locale, the audio client 20 sends the microphone data packets to the audio conferencing server 15. In the case the host device is in a shared locale, the audio client 20 sends the microphone data packets to the audio client aggregation node 25.

Audio client 20 also processes incoming audio data packets received either from the audio conferencing server 15 or the audio client aggregation node 25 that are to be played out on the speaker 54 of the host device. At the host device, incoming audio data packets are received by the network socket 42. The audio client 20 receives incoming audio data packets from the network socket 42 in the form of an audio client receive stream 50. The audio client receive stream 50 is also referred to as a speaker packet stream. The audio client 20 stores the incoming audio data packets (also referred to as "speaker data packets") into a jitter buffer 44. Jitter buffer 44 is used to compensate for network latency so as to create a seemingly continuous media stream for the speaker. The audio client 20 retrieves audio samples from the jitter buffer 44 at a periodic rate and places the audio samples into an output ring buffer 46. The Host OS Audio API 36 pulls the audio samples out of the output ring buffer 46, processes the signals (output device signal processing 48), and sends the processed audio signals to a digital-to-analog converter (DAC) 52 to generate the analog audio signals that are to be played out on the speaker 54.

As thus implemented, audio client 20 processes outgoing microphone data packets to be sent out over the data network and processes incoming speaker data packets received from the data network. There are numerous delays or latency associated with the audio signal processing operation. For example, the speaker and the microphone will each have its own hardware latency. The host OS audio API has an associated API/driver latency. The input and output signal processing stages have associated signal processing latency. The input and output ring buffers have associated ring buffer latency. The jitter buffer introduces jitter buffer latency for the audio client receive stream. And finally, the network socket has associated operating system network stack latency. The latency and the varying amount of latency between different host devices render it impossible for conference participants to use multiple active devices in the same locale to connect to the same conference call, unless the microphone and speaker data is aligned.

Figure 4:
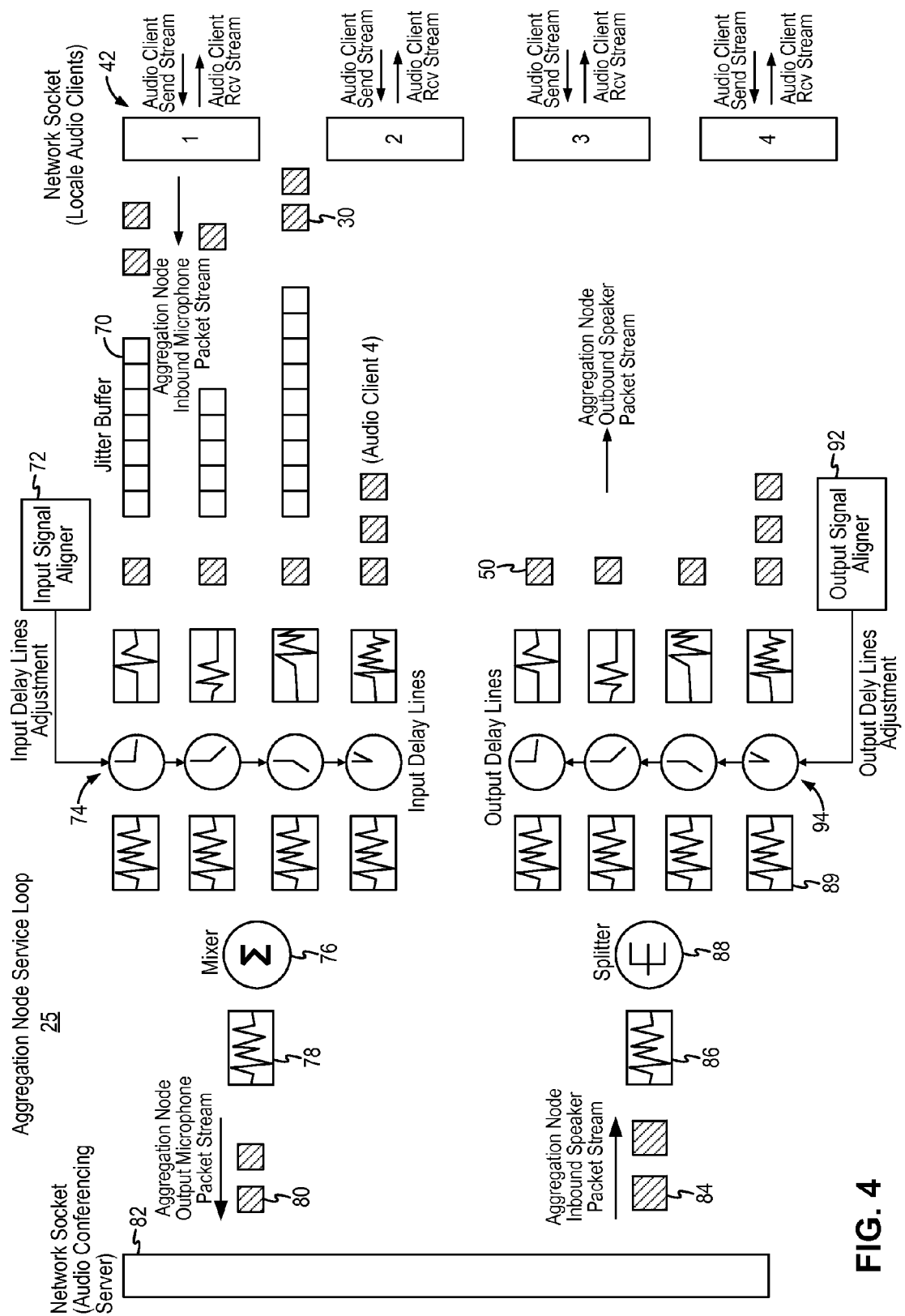
FIG. 4 is a functional diagram of an audio client aggregation node in some embodiments.

FIG. 4 is a functional diagram of an audio client aggregation node in some embodiments. The audio client aggregation node is a software process operating on a host device. As described above, an audio client aggregation node may be configured on a selected audio client node of a conference participant. In that case, the audio client aggregation node runs on the host device of the conference participant that has been selected as the aggregation node to receive the audio streams from other audio clients in the same locale. In that case, the selected host device has its own audio client running on the host device but also has a separate process running as the audio client aggregation node. In other embodiments, the audio client aggregation node may be configured on a dedicated device at a shared locale as a dedicated aggregation node. Alternately, the audio client aggregation node may be configured on the cloud-based audio conferencing server as a cloud-based audio client aggregation node.

The operation of the audio client aggregation node 25 (aggregation node 25) will be described with one or more inbound microphone packet streams 30 being received from the network sockets 42 associated with one or more audio client nodes running on host devices at a shared locale where the audio client nodes are connected to the aggregation node 25.

In the present embodiment, the aggregation node 25 is configured to receive inbound microphone data packets from four shared locale audio clients. In the present example, the aggregation node 25 is configured on the host device of audio client node 4. Accordingly, audio client nodes 1-3 are connected to the aggregation node 25 through a local area network to provide their microphone packet streams 30 and audio client node 4 provides its microphone packet stream 30 directly to the aggregation node 25.

With inbound microphone packet streams 30 being received from multiple audio client nodes 1-3 in the shared locale, the aggregation node 25 stores the inbound microphone data packets into respective jitter buffers 70. Jitter buffers 70 are used to compensate for the variable latency between the several microphone packet streams. The inbound microphone packet stream 30 from the associated audio client node 4 does not need a jitter buffer as the audio packets do not have to travel through a network to reach the aggregation node 25. Instead, the audio packets from local audio client node 4 can be injected into the aggregation node processing directly.

In embodiments of the present invention, the aggregation node 25 performs microphone alignment by introducing a delay to each microphone packet stream that is specific to the audio client node that generated the microphone packet stream. To that end, the aggregation node 25 includes a set of input delay lines 74, one delay line for each audio client node connected to the aggregation node, including the audio client associated with the aggregation node. Accordingly, the aggregation node 25 includes an input delay line 74 for each microphone packet stream received by the aggregation node. In the present example, four input delay lines 74 are provided for audio client nodes 1-4. The input delay lines 74 are controlled by an input signal aligner 72 which is configured to generate delay lines adjustment values for each of the input delay lines 74. The amount of microphone delay applied to each delay line 74 is calculated based on an audio timestamp for each audio client derived from a common timebase to align the inbound audio signals from multiple audio clients.

In operation, the aggregation node 25 pulls microphone data packets out of each jitter buffer and from the local audio client node (audio client 4) and processes the microphone data packets through the respective delay line 74. The delay lines 74 introduce delays that are specific to each audio client node to each inbound microphone packet stream. The microphone data packets for each inbound microphone packet stream go through its own delay line 74. With each delay line 74 applying the audio-client-specific delay, the microphone signals from all the audio clients will be lined up after the delay lines. The aligned microphone signals are mixed together by mixer 76 to form a mixed audio data packet 78 containing the audio signals of all of the audio clients connected to the aggregation node 25. The mixed audio data packets form an outbound microphone packet stream 80. The outbound microphone packet stream 80 from the aggregation node 25 is then provided through the network socket 82 to the audio conferencing server.

Meanwhile, the network socket 82 of the aggregation node 25 receives inbound speaker packet stream 84 from the audio conferencing server destined to the locale associated with the aggregation node. The inbound speaker packet stream 84 contains inbound speaker audio signals 86 being a mix of the audio signals of all of the conference participants. The inbound speaker audio signals 86 are coupled to a splitter 88 to produce copies of the inbound speaker audio signals 86 for each audio client. The splitter 88 produces individual speaker data packets 89 destined for each audio client node (for example, audio client nodes 1-4). In particular, each audio client node receives speaker audio signals from all other conference participants. That is, each audio client receives the speaker audio signals from all conference participants except the audio client's own speaker audio signal. That is, the audio signals received from the microphone associated with the audio client are not played out onto the speaker of the same audio client.

The separated speaker data packets 89 for the audio client nodes are aligned when received from the audio conferencing server. However, the latency through each audio client node is different. Therefore, if the aligned speaker data packets are played out on the speakers of each audio client node, the output sound will be mumbled as the audio signals played out by each speaker will not be aligned, due to the differences in each host device's individual latency.

Accordingly, the aggregation node 25 dealigns the separated speaker data packets 89 so that the speaker data packets will sound aligned when play out on the individual speakers of the host device of each audio client node. In embodiments of the present invention, the aggregation node 25 performs speaker alignment by introducing a delay to each speaker data packet 89 that is specific to the audio client node to which the speaker data packet is destined. To that end, the aggregation node 25 includes a set of output delay lines 94, one delay line for each audio client node connected to the aggregation node, including the audio client associated with the aggregation node. Accordingly, the aggregation node 25 includes an output delay line 94 for each outbound speaker packet stream to be generated by the aggregation node. In the present example, four output delay lines 94 are provided for audio client nodes 1-4. The output delay lines 94 are controlled by an output signal aligner 92 which is configured to generate delay lines adjustment values for each of the output delay lines 94. The amount of delay applied to each delay line 94 is based on the playout delay associated with each audio client, as calculated based on each audio client.

In operation, the aggregation node 25 receives the inbound speaker packet stream 84 and generates separated speaker data packets destined for each audio client. The aggregation node 25 processes the separated speaker data packets for each audio client through the respective output delay line 94. The delay lines 94 introduce delays that are specific to each audio client node to each outbound speaker data packet. The speaker data packets for each audio client node go through its own delay line 94. With each delay line 94 applying the audio-client-specific playout delay, the speaker signals for all the audio clients will become dealigned. The network socket 42 pulls the delay-adjusted speaker data packets from the delay lines and sends the speaker data packets to the respective audio client as the audio client receive stream. The delay-adjusted speaker data packets form the outbound speaker packet stream 50. The outbound speaker packet stream 50 are then provided through the network socket 42 to the respective audio client nodes.

In embodiments of the present invention, the cloud-based video/audio conferencing system and method of the present invention is realized by synchronizing or aligning the microphone audio signals and speaker audio signals of conference participant devices at the same locale. Various methods for microphone signal alignment and speaker signal alignment are possible. Example microphone signal alignment and speaker signal alignment methods are described below. The description below is illustrative only and not intended to be limiting. Other methods for performing microphone alignment or synchronization and speaker alignment or synchronization are possible.

Figure 5A:
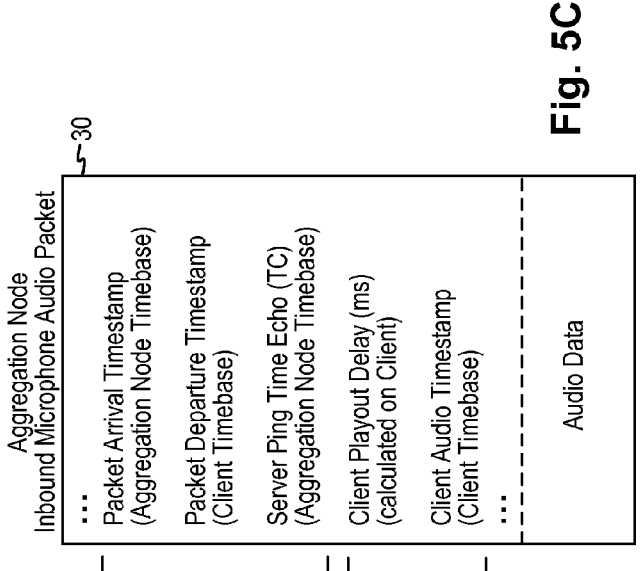
FIGS. 5A and 5B illustrate the operation of the input signal aligner and the output signal aligner, respectively, in embodiments of the present invention.
Figure 5B:
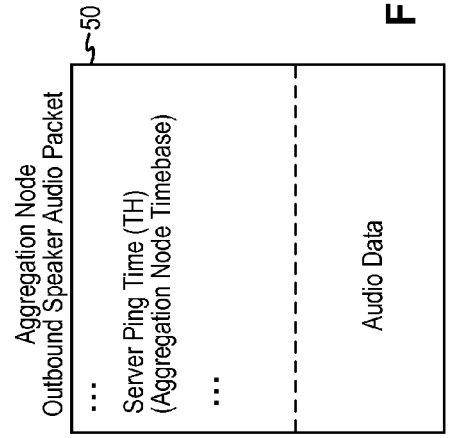
Figure 5C:
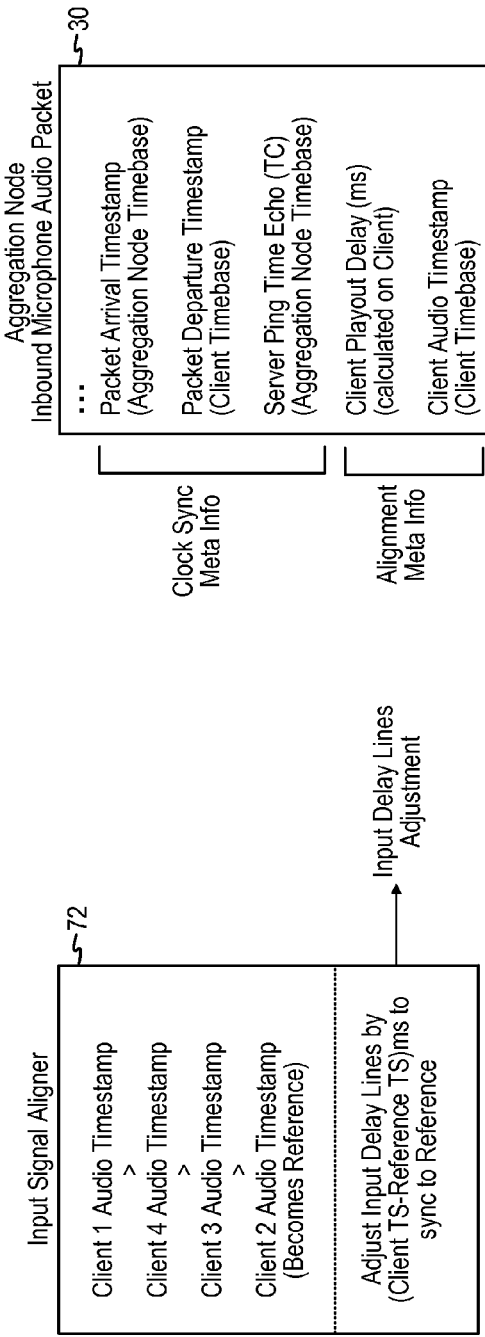
FIG. 5C illustrates an aggregation node inbound microphone audio packet in embodiments of the present invention.
Figure 5D:
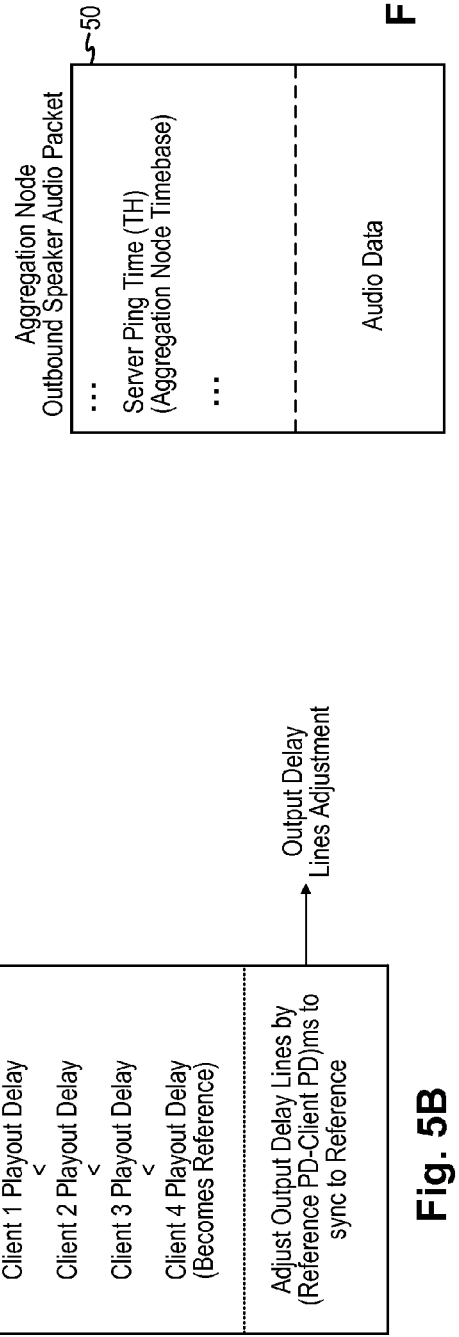
FIG. 5D illustrates an aggregation node outbound speaker audio packet in embodiments of the present invention.

The microphone signal alignment and speaker signal alignment methods will be described with reference to FIGS. 5A to 5D. FIGS. 5A and 5B illustrate the operation of the input signal aligner and the output signal aligner, respectively, in embodiments of the present invention. FIG. 5C illustrates an aggregation node inbound microphone data packet in embodiments of the present invention. FIG. 5D illustrates an aggregation node outbound speaker audio packet in embodiments of the present invention.

Microphone Alignment

In embodiments of the present invention, the audio clients' microphone audio packets are timestamped by the respective host OS audio API. The timing information is used by the input signal aligner 72 at the aggregation node 25 to align the audio clients' microphone audio streams. In particular, by estimating the latency contributed by the host device's audio hardware, driver, and the audio client signal processing, the conferencing system and method of the present invention derives a relatively accurate estimation of when the current audio samples were produced in the real world and captured by the host device ADC (for example, ADC 34 in FIG. 3). However, the audio client's audio timestamps are expressed in each host device's local clock timebase (audio client timebase). In order to align the audio streams relative to one another, the audio timestamps based on the audio client timebase are first translated to a common timebase.

In embodiments of the present invention, the audio client aggregation node 25 provides the common timebase for aligning the microphone audio streams from all the audio client nodes. The audio client aggregation node accepts connections from other audio client devices in the room and uses the audio client timestamp information provided in the audio clients' microphone data packets to provide the aligned mix of all the microphone audio signals in the shared locale to the remote audio conferencing server 15. A clock offset for each audio client relative to the aggregation node clock is calculated using clock sync meta information attached to each microphone data packet, as shown in FIG. 5C. The aggregation node 25 applies the clock offset to each audio client audio timestamp. In this manner, the clock of the aggregation node becomes the common timebase that is used to align all connected audio client microphone packet streams.

More specifically, referring to FIG. 5D, the aggregation node 25 sends its own local time—the "Server Ping Time"—in the aggregation node outbound speaker data packets 50 going to each of the audio clients in the shared locale. The Server Ping Time (TH) is based on the aggregation node timebase. The Server Ping Time is echoed back to the aggregation node on the inbound microphone data packets 30 from the audio clients of the shared locale. In particular, referring to FIG. 5C, the inbound microphone data packet 30 includes clock sync meta information which includes the Server Ping Time Echo (TC), which is the Server Ping time in a speaker data packet received from the aggregation node and to be echoed back to the aggregation node. The clock sync meta information further includes the audio client's local time at the time of packet departure—Packet Departure Timestamp—which is based on the audio client timebase. When the inbound microphone data packet 30 arrives at the aggregation node, the Packet Arrival Timestamp, which is based on the aggregation node timebase, is inserted into the clock sync meta information.

With the Server Ping Time Echo, the Packet Departure Timestamp and the Packet Arrival Timestamp thus provided in the clock sync meta info, the input signal aligner 72 can then calculate the clock offset for each audio client node. In one embodiment, a variant of Cristian's algorithm is used to calculate the clock offset. The accuracy of Cristian's algorithm is inversely correlated to the network Round Trip Time (RTT) between the computers whose clocks are being synchronized. The fact that the shared locale audio client nodes communicate with the aggregation node via the Local Area Network (LAN) enables the Cristian's algorithm to compute clock offsets which are accurate enough for the alignment purposes, since these RTTs will generally be much lower and exhibit more stability than if the audio clients and the aggregation node were communicating over the Internet. The calculated clock offset for each audio client is then used to translate the audio timestamp for each audio client from the audio client timebase to the common timebase of the aggregation node.

Once a stable clock offset is calculated for a particular audio client, the aggregation node is able to use the subsequent clock sync meta information transmitted in the microphone data packets to identify and correct for the inevitable clock drift that will happen between two different physical devices. In one embodiment, a threshold-based technique is used to resynchronize the audio client clocks which are drifting. In other embodiments, the magnitude of the drift can be calculated and corrected by resampling the audio client microphone stream to match the aggregation node's clock.

In some embodiments, the conferencing system and method also implements corrections for timestamp jitter. Audio devices often provide jittery timestamp information. Timestamp jitter is expected as the conferencing system is not running on a real time operating system and is subject to all sorts of scheduling jitter occurring within the host device's operating system. In some embodiments, the conferencing system and method applies one or more techniques to smooth out the timestamp jitter to obtain timestamp values that are more meaningful and usable. In some embodiments, techniques that can be applied to smooth out the timestamp jitter include a rolling linear regression, Kalman filtering, and a second order delay-locked loop.

Referring still to FIG. 5C, the microphone data packet 30 further includes alignment meta information which includes the client audio timestamp based on the client timebase and the audio client playout delay as calculated on the audio client. The client playout delay is used for speaker alignment and will be described in more detail below. The aggregation node translates the client audio timestamp to the common timebase by applying the respective clock offset for each audio client audio timestamp.

At the service loop iteration of the audio client aggregation node, the input signal aligner 72 compares the audio timestamps of all the audio client microphone packet streams, as shown in FIG. 5A. The audio timestamps have been translated to the common timebase so that they can be accurately compared. The audio client with the oldest timestamp is elected as the reference signal. In the present example, the audio timestamp of audio client 2 is selected as the reference signal. The input signal aligner 72 generates input delay lines adjustment values for the delay lines 74 based on the difference between the audio client timestamp and the reference timestamp—that is, each input delay line is adjusted by (Client timestamp—Reference timestamp). The delay lines adjustment values are provided to the respective delay lines 74. Once the current timestamp of the reference signal is determined, the delays of the remaining audio client microphone packet streams are adjusted to bring them into alignment with each other and relative to the reference timestamp.

In the present description, the aggregation node service loop refers to the thread running on the processor of the aggregation node to handle the operation of reading incoming audio packets from the network, processing incoming audio packets, producing and processing outgoing audio packets; and sending outgoing audio packets to the network.

For example, if an audio signal A from an audio client has a timestamp of 120 and the reference signal has a timestamp of 100, the audio signal A is assumed to be 20 units ahead of the reference signal and the delay line for audio signal A is adjusted to add an additional 20 units of delay, thus bringing signal A into alignment with the reference signal. The same is done for the remaining audio clients.

Speaker Alignment

In embodiments of the present invention, the audio client aggregation node also synchronizes all the speaker packet streams for the shared locale audio clients connected to the aggregation node. The aggregation node 25 receives speaker audio data packets from the remote audio conferencing server 15 and constructs properly aligned or properly dealigned signals for each audio client connection to provide synchronized playback of the conference call within the shared locale.

In one embodiment, as shown in FIG. 5C, each shared locale audio client reports its local playout delay back to the audio client aggregation node in its outgoing microphone data packets as the alignment meta info. In the present description, the "playout delay" is defined as the total time elapsed from the time the local speaker audio data packet stream arrives at the network interface (network socket) of the audio client's host device until the speaker audio data packet leaves the Digital-to-Analog Converter (DAC) of the host device. In one embodiment, referring back to FIG. 3, the playout delay of an audio client 20 is calculated by propagating the speaker data packet's arrival time at the Network Interface Card (NIC) (network socket 42) through the jitter buffer 44 and into the output ring buffer 46 serviced by the host device's audio API 36. The time elapsed from the speaker data packet arrival time until the speaker data packet is requested by the host audio API 36 can be considered the playout delay. By taking into account the driver and hardware latencies of the output device, an accurate assessment can be obtained of how long it takes for audio samples to hit the air from the time the audio samples arrive at the network interface card (network socket 42).

In some embodiments, the playout delay is computed as the time duration from the speaker data packet arriving at the audio client and the speaker data packet being played out on the speaker. Referring back to FIG. 3, the arrival time $T_A$ of the speaker data packet at the network socket 42 is known. The speaker data packet propagates through the jitter buffer and the ring buffer and at time $T_P$, the host device's audio API 36 requests the speaker data packet for playout. Then, the speaker data packet is provided to the host device DAC to be played out on the speaker where the actual time for the speaker to play out the audio signal is time duration $T_L$. In the present embodiment, the playout delay is given as $(T_P-T_A)+T_L$. The playout delay calculated by each audio client is inserted in the alignment meta information of the microphone data packet of the audio client to be sent up to the aggregation node. In this manner, the aggregation node has the playout delay information for all of the audio clients.

During the service loop iteration of the audio client aggregation node, the speaker playout delays reported by the connected audio clients are compared. In the present embodiment, the output signal aligner 92 compares the playout delay of all the audio clients, as shown in FIG. 5B. The audio client reporting the longest playout delay is elected as the reference signal for speaker alignment. In the present example, the playout delay of audio client 4 is selected as the reference signal. The output signal aligner 92 generates output delay lines adjustment values for the delay lines 92 based on the difference between the reference playout delay and the audio client playout delay—that is, each output delay line is adjusted by (Reference playout delay—Client playout delay). The delay lines adjustment values are provided to the respective delay lines 94.

When speaker data packets are received from the remote audio conferencing server, prior to sending the speaker data packet to each of the connected audio clients, the audio client aggregation node 25 writes a copy of the speaker data packet to a delay line per audio client (e.g. delay lines 94 of FIG. 4). Alternately, the aggregation node 25 produces copies of the speaker data packet per audio client containing the audio signals for all other conference participant except the audio client's own audio signal. After that, each audio client's delay line 94 is adjusted to bring the speaker data packet into alignment with the reference signal.

For instance, if client A reports a playout delay of 50 units and the reference signal has a playout delay of 100 units, a delay of 50 units is added to client A's delay line. As a result of the delay line adjustment, a set of seemingly dealigned speaker data packets is generated. The aggregation node produces the dealigned speaker data packets from each audio client's delay line and sends the dealigned speaker data packets via the LAN to each audio client of the shared locale. In this manner, when the dealigned speaker data packets are played out by the speakers of the host devices in the shared locale, the intentionally dealigned speaker signals will sound aligned on the play out due to the varying playout delay of each host device.

As described above, in the speaker data packet, the aggregation node also attaches its own local time (Server Ping Time) at the time of packet departure to enable the clock synchronization which takes place in the microphone stream processing. In this manner, timestamp information for performing clock synchronization between the aggregation node and all the audio clients is piggybacked onto the audio streams that travels between the audio clients and the aggregation node. Conventional clock synchronization scheme often requires dummy data packets sent from the host to ping the client and to receive a response to calculate the time offset. In embodiments of the present invention, the timestamp information for clock synchronization is appended to the audio data packets to simplify the clock synchronization operation.

Alternate Embodiments

In the above described embodiments, synchronization of the microphone signals of multiple shared locale audio clients is achieved using a timestamp based method and synchronization of the speaker signals of multiple shared locale audio clients is achieved using the playout delay associated with the host device. As described above, the playout delay is the delay time from the remote conferencing server to the speaker and the playout delay is measured and adjusted centrally.

In other embodiments, other methods to perform audio synchronization of the microphone signals and the speaker signals at the shared locale can be used. In some embodiments, the microphone signals can be aligned using a playup delay. The playup delay refers to the delay time from the microphone to the remote conferencing server. The playup delay is measured and reported to the aggregation node where the aggregation node aligns the microphone packet streams of the shared locale audio clients based on the reported playup delay information. In other embodiments, the speaker signals can be aligned using a timestamp method. Each speaker packet is attached with a "play at" timestamp generated by the audio client aggregation node. Each speaker receiving a speaker packet with a "play at" field will adjust the playout delay of the speaker signals according to the play-at timestamp so that all the speaker signals will be played out at the play-at time specified by the aggregation node. Various methods for audio signal alignment can be used without departing from the spirit of the present invention. The same-locale multiple-device conferencing method of the present invention performs audio alignment or synchronization to realize an improved conference experience by enabling participants in a shared locale to use individual devices to connect to the conference call.

Share-Locale Detection

In embodiments of the present invention, the same-locale multiple-device conferencing method implements various methods to detect for multiple connections at the same physical location. In particular, a share-locale detection and connection method is implemented at each audio client and determines when a particular audio client joining a conference call is in the same locale as other audio clients already connected to the conference call. The audio client may join a conference call and determine that it is in the same locale as an existing audio client aggregation node. The audio client may then be connected to the existing audio client aggregation node. Alternately, the audio client may be selected to become an audio client aggregation node itself and begin accepting connections from other audio clients in the same locale. The share-locale detection method is implemented to provide a seamless user experience to the conference participant joining the conference call. In some embodiments, the share-locale detection method operates automatically to connect participants in a shared locale to a conference call so that the participants are not aware of whether or not they are connected directly to the remote audio conferencing server or to an aggregation node brokering their interaction with the remote audio conferencing server on their behalf.

In some embodiments, every audio client node that connects to the remote audio server can be assigned as an aggregation node. An audio client wishing to participate in a locale-aggregated conference call will connect to the remote audio conferencing server requesting to join the conference call. In one embodiment, the audio client is then provided with a list of all aggregation nodes currently on the conference call. As the list of aggregation nodes changes, the audio clients may be notified of the changes. When an audio client wishes to opt in to the conference call as a locale aggregate, the audio client loops through the list of audio client aggregation node candidates concurrently available and attempts to connect to one of the aggregation node. In this case, multiple aggregation nodes may exist at the same location.

In some embodiments, the remote conferencing server or an assigned aggregation node may broadcast a message informing all of the same-locale audio clients of the identity of the aggregation node. The audio clients, when attempting to connect to the conference call, can then be directed to the identified aggregation node either manually or automatically. Alternately, the remote conferencing server may redirect the audio client to the respective aggregation node.

In another embodiment, the local audio client aggregation node produces a super audible sound signature unique to the locale and assigned to the aggregation node when the aggregation node connects to the remote audio conferencing server. When an audio client requests connection to a conference call, the audio conferencing server can discern the locale by previewing the microphone stream of the connecting audio client and detecting for the super audible sound signature. The server compares the received microphone stream to the known sound signatures associated with one or more aggregation nodes and directs the audio client to connect to the aggregation node assigned with the same sound signature detected from the audio client's microphone. In this case, the remote audio conferencing server is able to prevent multiple aggregation nodes from being selected at the same locale.

In yet another embodiment, the remote audio conferencing server identifies a locale by sampling over a preview period the background noise signature received from each audio client requesting to join a conference call. In some embodiments, the remote audio conferencing server may generate an Acoustic Background Spectrum of each audio client connecting to the conference call. The Acoustic Background Spectrum of each audio client can be thought of as a room fingerprint and would enable the remote audio conferencing server to identify if two or more audio clients may be in the same locale. In this manner, the remote audio conferencing server may intelligently aggregate audio clients that have the same room fingerprint. The remote audio conferencing server may select an aggregation node as needed to build the ideal set of aggregated and unaggregated locales for the conference call. In other embodiments, the Acoustic Background Spectrum can be used together with other heuristics to make the determination of a shared locale presence. For example, the remote audio conferencing server can determine if one or more audio clients are on the same local area network. Alternately, the remote audio conferencing server can determine the shared locale presence by using geodata from user devices to discern if two or more user devices are physically close to each other.

Finally, in some embodiments, the remote audio conferencing server can act as the centralized control to organize the audio clients at a shared locale. All audio client nodes connect to the remote audio conferencing server initially. The remote audio conferencing server determines that one or more audio clients are in fact in a shared locale and the remote audio conferencing server can then redirect the shared-local audio clients to connect to the aggregation node assigned to the locale.

In embodiments of the present invention, the selection of a user device as the aggregation node in a share-locale conference call can be made using one or more factors. In one embodiment, the remote conferencing server selects an audio client node with the best processor, in terms of speed or capability. In another embodiment, the remote conferencing server selects the audio client of the conference call organizer as the aggregation node. In other embodiments, the remote conferencing server selects the audio client of a desktop computer over a mobile device to function as the aggregation node.

The cloud-based video/audio conferencing system of the present invention realizes many advantages over conventional cloud-based conferencing systems. First, the cloud-based video/audio conferencing system of the present invention enables multiple active devices to be used in a shared locale to connect to the same conference call. In the manner, the user experience at the conference call is greatly improved. Second, the cloud-based video/audio conferencing system of the present invention performs full duplex synchronization of the microphone and speaker signals. The full duplex synchronization enables the use of multiple user devices at the same locale for the same conference call. Lastly, the cloud-based video/audio conferencing system of the present invention is capable of replicating the quality of a high-send video conferencing system by using consumer devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing audio signals of a conference call comprising:
   detecting, at a conferencing server, a plurality of audio clients connecting to the conference call from a same locale;
   selecting an audio client aggregation node at the same locale;
   connecting the plurality of audio clients to the audio client aggregation node;

receiving at the audio client aggregation node, microphone audio signals from the connected audio clients, each microphone audio signal containing an audio timestamp based on an audio client timebase;

synchronizing, at the audio client aggregation node, the microphone audio signals using a clock of the audio client aggregation node and the audio timestamp based on the audio client timebase;

receiving, at the audio client aggregation node, speaker audio signals destined for the connected audio clients; and synchronizing, at the audio client aggregation node, the speaker audio signals.

2. The method of claim 1, wherein in response to detecting a plurality of audio clients connecting to the conference call from a same locale and selecting an audio client aggregation node at the same locale, the method further comprises:

providing to each audio client a list of at least one available audio client aggregation node at the same locale; and connecting at least one audio client to an audio client aggregation node in the same locale.

3. The method of claim 1, wherein in response to detecting a plurality of audio clients connecting to the conference call from a same locale and selecting an audio client aggregation node at the same locale, the method further comprises:

in response to receiving at the conferencing server a request from a first audio client of the plurality of audio clients to join the conference call, directing the first audio client to connect to the audio client aggregation node at the same locale.

4. The method of claim 1, wherein detecting a plurality of audio clients connecting to the conference call from a same locale comprises:

producing a super audible sound signature from the audio client aggregation node in the same locale; and in response to detecting in the microphone signal of a first audio client the super audible sound signature, determining that the first audio client is located in the same locale as the audio client aggregation node.

5. The method of claim 1, wherein detecting a plurality of audio clients connecting to the conference call from a same locale comprises:

sampling a background noise signature of each of the plurality of audio clients;

in response to detecting in the microphone signal of a first audio client the same background noise signature as a second audio client, determining that the first audio client and the second audio client are located in the same locale.

6. The method of claim 1, wherein selecting an audio client aggregation node at the same locale comprises:

selecting a first audio client of the plurality of audio clients as the audio client aggregation node, wherein the audio client aggregation node receives audio signals from the first audio client and also receives audio signals from other audio clients connected to the audio client aggregation node in the same locale.

7. The method of claim 1, wherein selecting an audio client aggregation node at the same locale comprises:

selecting a dedicated device in the same locale as the audio client aggregation node.

8. The method of claim 1, wherein selecting an audio client aggregation node at the same locale comprises:

selecting an aggregation node at the conferencing server as the audio client aggregation node.

9. The method of claim 1, wherein synchronizing, at the audio client aggregation node, the microphone audio signals comprises:

assigning a clock of the audio client aggregation node as a common timebase;

determining, at the audio client aggregation node, a clock offset value for each audio client with reference to the common timebase;

translating, for each audio client, the audio timestamp of the microphone audio data packets from the audio client timebase to the common timebase using the clock offset value for the respective audio client; and synchronizing the microphone audio signals of the plurality of audio clients using the translated audio timestamps.

10. The method of claim 9, further comprising:

comparing the translated audio timestamps of the microphone audio signals of the plurality of audio clients;

selecting an oldest translated audio timestamp of the microphone audio data packets as a reference timestamp;

determining delays for each of the plurality of audio clients based on the translated audio timestamp and the reference timestamp; and applying the delays to the microphone audio signals of the plurality of audio clients to synchronize the microphone audio signals.

11. The method of claim 9, further comprising:

receiving, at the audio client aggregation node, in the microphone audio data packet a server ping time echo based on the common timebase, the server ping time echo being derived from a server ping time sent to the audio clients in previous speaker audio data packets; and determining, at the audio client aggregation node, the clock offset value for each audio client with reference to the common timebase using at least the server ping time echo information.

12. The method of claim 1, wherein synchronizing, at the audio client aggregation node, the speaker audio signals comprises:

receiving, at the audio client aggregation node, an audio client playout delay value in the microphone audio data packet associated with each audio client; and applying the playout delays to the speaker audio signals of the plurality of audio clients to synchronize the speaker audio signals.

13. The method of claim 1, wherein synchronizing the microphone audio signals and the speaker audio signals comprises:

synchronizing, at the audio client aggregation node, the microphone audio signals and the speaker audio signals concurrently.

14. An audio conferencing system for processing audio signals of a conference call, comprising:

a processor configured to:

detect, at a conferencing server, a plurality of audio clients connecting to the conference call from a same locale;

select an audio client aggregation node at the same locale;

connect the plurality of audio clients to the audio client aggregation node;

receive, at the audio client aggregation node, microphone audio signals from the connected audio clients, each microphone audio signal containing an audio timestamp based on an audio client timebase;

synchronize, at the audio client aggregation node, the microphone audio signals using a clock of the audio client aggregation node and the audio timestamp based on the audio client timebase;

receive, at the audio client aggregation node, speaker audio signals destined for the connected audio clients; and synchronize, at the audio client aggregation node, the speaker audio signals; and a memory coupled to the processor and configured to provide the processor with instructions.

15. The audio conferencing system of claim 14, wherein synchronizing, at the audio client aggregation node, the microphone audio signals comprises:

assign a clock of the audio client aggregation node as a common timebase;

determine, at the audio client aggregation node, a clock offset value for each audio client with reference to the common timebase;

translate, for each audio client, the audio timestamp of the microphone audio data packets from the audio client timebase to the common timebase using the clock offset value for the respective audio client; and synchronize microphone audio signals of the plurality of audio clients from the microphone audio data packets using the translated audio timestamps.

16. The audio conferencing system of claim 14, wherein the processor is configured to:

receive an audio playout delay value in the microphone audio data packet associated with each audio client; and apply the playout delay to the speaker audio signals of the plurality of audio clients to synchronize the speaker audio signals.

17. The audio conferencing system of claim 14, wherein one of at least two audio client nodes at the same locale is selected as the audio client aggregation node.

18. A method comprising:

detecting, at a conferencing server, a plurality of audio client nodes connecting to a conference call using a variety of connection media, wherein at least two of the audio client nodes are at a shared locale, and wherein each audio client node includes an audio client executing on an individual user device;

connecting the at least two audio client nodes at the shared locale to an audio client aggregation node;

receiving, at the audio client aggregation node, microphone audio signals including microphone data packets from the at least two audio client nodes at the shared locale, each microphone data packet including an audio timestamp based on a client timebase of the associated audio client node;

determining, at the audio client aggregation node, a clock offset value for each audio client with reference to a common timebase of the audio client aggregation node;

translating, for each audio client, the audio timestamp to the common timebase using the clock offset value for the respective audio client;

synchronizing, at the audio client aggregation node, using the corresponding translated audio timestamps microphone audio signals received from the at least two audio client nodes at the shared local connected to the audio client aggregation node;

aggregating, at the audio client aggregation node, the synchronized microphone audio signals into a single audio stream; and outputting, at the audio client aggregation node, the single audio stream to the conferencing server.

19. The method of claim 17, further comprising:

selecting one of the at least two audio client nodes at the shared locals as the audio client aggregation node.

20. The method of claim 17, further comprising:

selecting the conferencing server as the audio client aggregation node.

21. The method of claim 17, further comprising:

receiving, at the audio client aggregation node, a mixed audio stream from the audio conference server;

separating, at the audio client aggregation node, the mixed audio stream into speaker data packets for each of the plurality of audio client nodes, wherein the speaker data packets are aligned in the mixed audio stream received from the audio conference server;

synchronizing, at the audio client aggregation node, the speaker data packets for each of the plurality of audio client nodes by de-aligning each speaker data packet specific to the associated audio client node; and outputting, at the audio client aggregation node, to each audio client node speaker de-aligned data packets from the plurality of audio client nodes except for the given audio client node's own audio stream.

* * * * *